Figure 1:
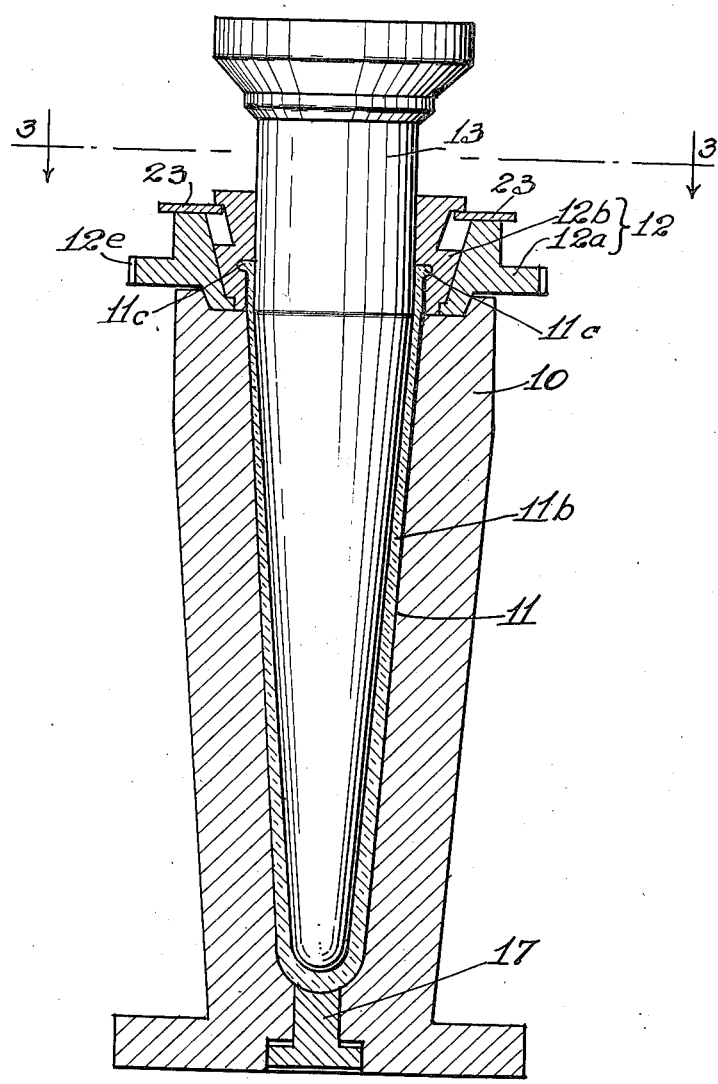

Sept. 7, 1943.        G. E. MEREDITH ET AL        2,328,662
TRANSFER RING FOR MOLDING PURPOSES
Filed July 10, 1941        3 Sheets-Sheet 3

INVENTORS
GROVER E. MEREDITH
CORTLAND W. DAVIS
BY
Albert C. Bell
ATTORNEY.

Patented Sept. 7, 1943

2,328,662

UNITED STATES PATENT OFFICE 2,328,662

TRANSFER RING FOR MOLDING PURPOSES

Grover E. Meredith, Jonesboro, and Cortland W. Davis, Summitville, Ind., assignors to The Mantle Lamp Company of America, Chicago, Ill., a corporation of Illinois Application July 10, 1941, Serial No. 401,692

6 Claims. (Cl. 49—70)

The invention pertains to an improved means for handling glass structures in connection with the molding thereof by pressing and blowing operations, so that said structures may be transferred from one mold to another without employing split transfer rings as has been frequently done in the past. The invention more specifically consists of an improved construction of transfer ring including two portions which may be moved relatively to each other, thereby expanding the inner portion relatively to the outer portion to release the glass article upon its completion and contracting the inner portion to place it in a position relatively to the outer portion to engage the glass article during the making of the same, in such a manner as to sustain the weight of the glass article and carry it from one mold to another. The improved transfer ring construction is particularly applicable to the molding of glass articles provided with projections of small extent which are engaged by the transfer ring, so that the amount of expansion of the inner portion of the transfer ring within limits which are practical, may serve to free the ring from said glass projections and thereby obviate the necessity of making the transfer ring of the split type. An important advantage of the transfer ring construction is that it facilitates a more rapid handling of the glass articles than is possible with transfer rings of the split type.

The invention is applicable to machines for automatically and rapidly producing pressed and blown glass articles in quantity, particularly where the article is produced by first making a glass parison in a parison mold by a pressing operation, and then completing the article by a blowing operation in a second or blow-mold.

The transfer ring of the invention specifically includes two portions having tapered cooperating surfaces so that relative axial movement of the two portions in one direction will tightly hold the inner portion of the transfer ring in its position for engaging a glass article being molded, and movement axially in the reverse direction of the two parts relatively to each other will release the inner portion so that its parts may expand radially to free them from the glass article that has been engaged by the inner portion of the transfer ring. The inner portion of the transfer ring consists preferably of a plurality of segments to permit the expansion and contraction of said inner portion, the parts of the transfer ring being held together in a manner to limit the relative movement of the parts of the ring and to prevent complete dissociation of the parts from each other.

Figure 2:
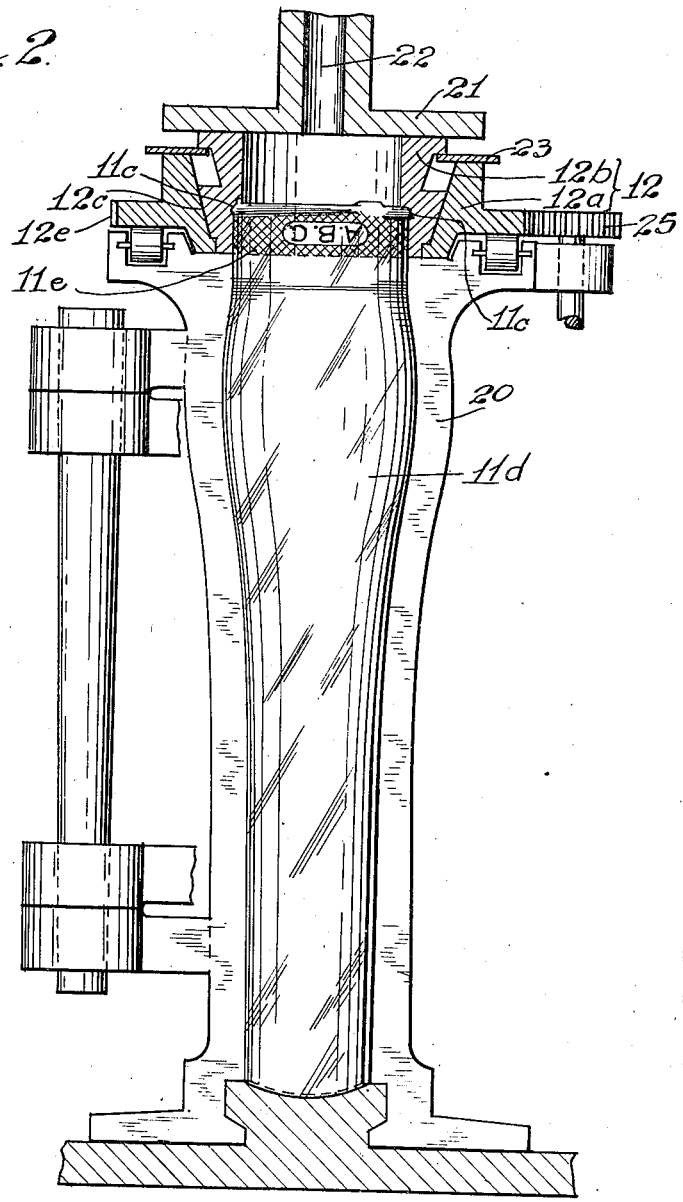
Figure 3:
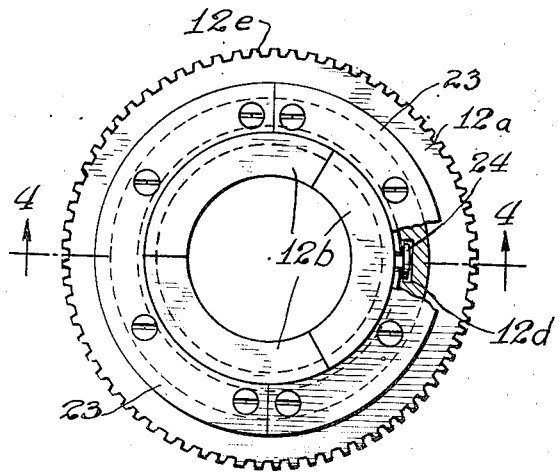
Figure 6:
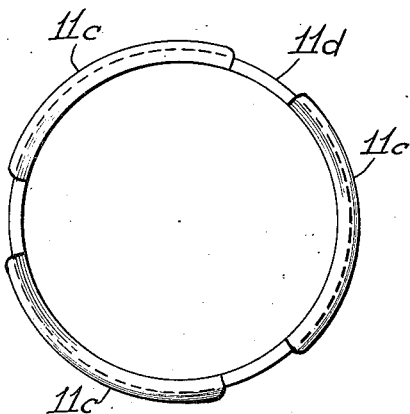
Figure 4:
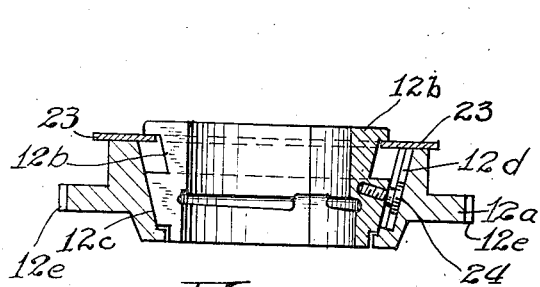
Figure 5:
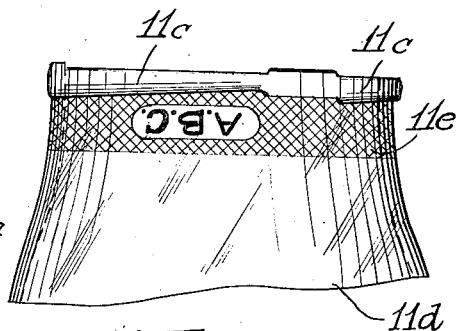

The invention will best be understood by reference to the accompanying drawings illustrating a preferred embodiment thereof, in which:

Fig. 1 shows in vertical, central, sectional view a parison mold for producing a lamp chimney, in which the glass charge is in a position resulting from a pressing operation, the transfer ring of the invention being shown on the mold and in engagement with the completed parison, Fig. 2 shows in vertical, central, sectional view a blow-mold for receiving the parison produced in Fig. 1 and illustrates the completely formed chimney resulting from a blowing operation in the blow-mold shown in Fig. 2, the transfer ring being shown on the blow-mold in its chimney-engaging position, Fig. 3 is a plan view of the transfer ring taken along the line 3—3 in Fig. 1, the plunger being removed and the transfer ring being shown separately from the mold to more clearly illustrate the construction of the transfer ring, Fig. 4 is a vertical, sectional view through the transfer ring taken along the line 4—4 in Fig. 3, Fig. 5 shows in front elevation and to an enlarged scale, the upper portion of a lamp chimney after its completion and in the position it occupied during its molding, and Fig. 6 is a plan view of the structure shown in Fig. 5.

Similar numerals refer to similar parts throughout the several views.

As shown in Fig. 1, a mold 10 is illustrated having a tapered bore 11, the body portion of which mold has resting upon its upper end, a head portion comprising a transfer ring construction 12 having a cavity of the size and shape of the base portion of the lamp chimney to be made. The transfer ring is provided with a central cylindrical bore which is a sliding fit on a plunger 13. The mold 10 is provided with a lower member 17 to close the lower end of the bore 11 and impart the desired form to the lower end of the completed parison.

Fig. 1 illustrates the condition of the parison 11b after the glass charge has been introduced into the mold 10 and acted upon by the plunger 13. It will be noted that the action of the plunger 13 forces the molten glass into indentations in the inner portion 12b of the transfer ring to form projections 11c on the base of the chimney structure, and that the inner portion 12b of the transfer ring is provided with an outer conical surface engaging a similar conical bore in the outer portion 12a of the transfer ring. It will also be noted that as a result of the bore 11 being conical and without obstruction, when the parison 11b has been formed as shown in Fig. 1, and after the plunger 13 has been moved to clear the upper end of the mold, the parison 11b may be removed from the mold 10 by axial movement of the transfer ring 12 upwardly, and without requiring the mold to be of the split type.

Immediately after the parison 11b has been completed as described, it is removed from the mold 10 in the manner referred to by means of the transfer ring 12, and placed in the mold 20 shown in Fig. 2, with the transfer ring 12 resting on the rollers at the upper end of the mold. Immediately after this is done, the transfer ring is enclosed at its upper end by a cover plate or blow head 21 having an air passage 22 extending therethrough, and air under pressure is admitted into the parison to expand it to fill the mold 20, which mold is of the split type to permit the removal of the completed lamp chimney. After the completion of the chimney and its removal from the mold 20, the transfer ring 12 may be removed from the base of the chimney by permitting its inner portion 12b to rest on the chimney and at the same time permitting its outer portion 12a to move downwardly relatively to the portion 12b, which condition permits the portion 12b to expand to free the chimney projections 11c, and the transfer ring 12 may be moved axially from its position around the base of the chimney. The chimney making process described is illustrative of the use of the transfer ring of the invention, and we do not herein claim said process or the mold structures illustrated.

In chimney making, it is desirable to rotate the glass parison in the blow-mold 20, during the blowing of the chimney, to produce a polished surface thereon, which may conveniently be effected by providing the flange of the ring member 12a with gear teeth 12e, and rotating the ring and article in any desired manner, for example by a gear 25 meshing with the gear teeth 12e, as illustrated in Fig. 2. If preferred the under surface of the blow head 21 may be designed to rotate the transfer ring by frictional engagement.

The construction of the transfer ring 12 will be better understood by reference to Figs. 3 and 4 in which the inner portion 12b is shown as consisting of three segments of 120° each, with their ends closely fitted to provide a continuous bore when the segments are held closely together by the engagement of their conical outer surfaces with the conical bore 12c in the portion 12a. The segments 12b are provided externally with annular recesses near their outer ends to receive the inner portion of a retaining ring 23 which is in two parts and secured to the portion 12a by suitable screws as indicated, to facilitate assembling the transfer ring. As a result of the construction described, when the outer portion 12a is supported, as for example during the molding of a chimney as illustrated in Figs. 1 and 2, and the inner portion 12b is in its lowermost position permitted by its engagement with the conical bore 12c, the ends of the segments 12b are held tightly together. The angle of the bore 12c is preferably so taken that the portion 12a may be readily displaced axially relatively to the portion 12b in releasing the latter so that its segments may expand.

It will also be noted that the expanded condition of the portion 12b is readily accomplished by permitting the finished chimney or other glass article to support the transfer ring, in which case the support is communicated to the inner portion 12b and the outer portion 12a, then without support, may readily be moved downwardly to free the inner portion for expansion. In some cases it is found desirable to impart angular movement to the transfer ring to free it from the projections on the glass article, and to insure that such movement may be imparted to the inner portion 12b by turning the outer portion 12a, the portion 12a is illustrated as provided with an axially extending T-shaped slot or keyway 12d receiving a key in the form of the head of a shouldered screw 24 threaded into one of the segments 12b, so that when the segments move axially relatively to the outer portion 12a, the screw 24 will have corresponding movement in the slot 12d, but that said slot will prevent angular movement of the segments 12b relatively to the outer portion 12a of the transfer ring. In Figs. 5 and 6 the projections 11c on the finished chimney 11d are illustrated, these projections being provided to lock the chimney in place on the burner with which it is used.

The inner surface of the inner portion 12b of the transfer ring, where it engages the glass article, may, if desired, be provided with characters, symbols or markings of any kind, producing corresponding molded characters, symbols or markings on the glass article, for advertising, identifying or other purposes, as illustrated in Figs. 2 and 5, at 11e.

While the transfer ring described is illustrated as used in connection with the making of a lamp chimney, it will be understood that it is adapted for use in making any other pressed glass articles, its use being limited only by the size of the projections from the portion of the glass article engaged by the transfer ring and by the practical limits of expansion permissible with the transfer ring. It will also be understood that while the structure providing for expansion of the transfer ring is illustrated as of the particular kind described, equivalent constructions may be used without departing from the invention, and that where the inner portion of the transfer ring is sectional as described, it may consist of any number of segments adapted to the intended purpose of the transfer ring in any case.

While we have shown our invention in the particular embodiment above described, it will be understood that we do not limit ourselves thereto as we may employ equivalents thereof without departing from the scope of the appended claims.

Having thus described our invention, what we claim is:

1. In a mold construction for producing glass articles, a mold having a vertical axis and including in combination a body portion having a mold cavity, and a head portion resting upon and supported by said body portion and readily separable from said body portion, said head portion comprising outer and inner annular members, said outer member having a lower end conformation engaging the upper end of said body portion and restraining said outer member from radial displacement relatively to said body portion, said outer member having a conical inner surface converging downwardly, said inner member being sectional and having an outer conical surface fitting the inner surface of said outer member for the lowermost position of said inner member relatively to said outer member, said inner member having an upper position relatively to said outer member freeing said inner member radially from said outer member, and said inner member having an inner surface continuing from the mold cavity in said body portion and completing in said inner member the upper end portion of the mold cavity, whereby said head portion constitutes a transfer ring for removing a molded article from said body portion, readily removable from said molded article by downward movement of said outer member relatively to said inner member.

2. In a mold construction for producing glass articles, a mold having a vertical axis and including in combination a body portion having a mold cavity, a head portion resting upon and supported by said body portion and readily separable from said body portion, said head portion comprising outer and inner annular members, said outer member having a lower end conformation engaging the upper end of said body portion and restraining said outer member from radial displacement relatively to said body portion, said outer member having a conical inner surface converging downwardly, said inner member being sectional and having an outer conical surface fitting the inner surface of said outer member for the lowermost position of said inner member relatively to said outer member, said inner member having an upper position relatively to said outer member freeing said inner member radially from said outer member, and said inner member having an inner surface continuing from the mold cavity in said body portion and completing in said inner member the upper end portion of the mold cavity, whereby said head portion constitutes a transfer ring for removing a molded article from said body portion, readily removable from said molded article by downward movement of said outer member relatively to said inner member, and a stop member limiting downward movement of said outer member relatively to said inner member and preventing the removal of said inner member from within said outer member.

3. In a mold construction for producing glass articles, a mold having a vertical axis and including in combination a body portion having a mold cavity, a head portion resting upon and supported by said body portion and readily separable from said body portion, said head portion comprising outer and inner annular members, said outer member having a lower end conformation engaging the upper end of said body portion and restraining said outer member from radial displacement relatively to said body portion, said outer member having a conical inner surface converging downwardly, said inner member being sectional and having an outer conical surface fitting the inner surface of said outer member for the lowermost position of said inner member relatively to said outer member, said inner member having an upper position relatively to said outer member freeing said inner member radially from said outer member, and said inner member having an inner surface continuing from the mold cavity in said body portion and completing in said inner member the upper end portion of the mold cavity, whereby said head portion constitutes a transfer ring for removing a molded article from said body portion, readily removable from said molded article by downward movement of said outer member relatively to said inner member, said inner member having an annular groove in its outer surface, and a retaining ring carried by said outer member and loosely entering said groove, said retaining ring and said groove permitting said relative downward movement of said outer member and retaining said outer and inner members in assembled relation.

4. In a mold construction for producing glass articles, a mold having a vertical axis and including in combination a body portion having a mold cavity, a head portion resting upon and supported by said body portion and readily separable from said body portion, said head portion comprising outer and inner annular members, said outer member having a lower end conformation engaging the upper end of said body portion and restraining said outer member from radial displacement relatively to said body portion, said outer member having a conical inner surface converging downwardly, said inner member being sectional and having an outer conical surface fitting the inner surface of said outer member for the lowermost position of said inner member relatively to said outer member, said inner member having an upper position relatively to said outer member freeing said inner member radially from said outer member, and said inner member having an inner surface continuing from the mold cavity in said body portion and completing in said inner member the upper end portion of the mold cavity, whereby said head portion constitutes a transfer ring for removing a molded article from said body portion, readily removable from said molded article by downward movement of said outer member relatively to said inner member, devices restraining said outer and inner members from relative rotation, and means for rotating said outer member relatively to said body portion.

5. In a mold construction for producing glass articles, a mold having a vertical axis and including in combination a body portion having a mold cavity, a head portion resting upon and supported by said body portion and readily separable from said body portion, said head portion comprising outer and inner annular members, said outer member having a lower end conformation engaging the upper end of said body portion and restraining said outer member from radial displacement relatively to said body portion, said outer member having a conical inner surface converging downwardly, said inner member being sectional and having an outer conical surface fitting the inner surface of said outer member for the lowermost position of said inner member relatively to said outer member, said inner member having an upper position relatively to said outer member freeing said inner member radially from said outer member, and said inner member having an inner surface continuing from the mold cavity in said body portion and completing in said inner member the upper end portion of the mold cavity, whereby said head portion constitutes a transfer ring for removing a molded article from said body portion, readily removable from said molded article by downward movement of said outer member relatively to said inner member, a stop member limiting downward movement of said outer member relatively to said inner member and preventing the removal of said inner member from within said outer member, devices restraining said outer and inner members from relative rotation, and means for rotating said outer member relatively to said body portion.

6. In a mold construction for producing glass articles, a mold having a vertical axis and including in combination a body portion having a mold cavity, a head portion resting upon and supported by said body portion and readily separable from said body portion, said head portion comprising outer and inner annular members, said outer member having a lower end conformation engaging the upper end of said body portion and restraining said outer member from radial displacement relatively to said body portion, said outer member having a conical inner surface converging downwardly, said inner member being sectional and having an outer conical surface fitting the inner surface of said outer member for the lowermost position of said inner member relatively to said outer member, said inner member having an upper position relatively to said outer member freeing said inner member radially from said outer member, and said inner member having an inner surface continuing from the mold cavity in said body portion and completing in said inner member the upper end portion of the mold cavity, whereby said head portion constitutes a transfer ring for removing a molded article from said body portion, readily removable from said molded article by downward movement of said outer member relatively to said inner member, said inner member having an annular groove in its outer surface, a retaining ring carried by said outer member and loosely entering said groove, said retaining ring and said groove permitting said relative downward movement of said outer member and retaining said outer and inner members in assembled relation, devices restraining said outer and inner members from relative rotation, and means for rotating said outer member relatively to said body portion.

GROVER E. MEREDITH.
CORTLAND W. DAVIS.